United States Patent [19]

Alferness et al.

[11] Patent Number: 5,009,477
[45] Date of Patent: Apr. 23, 1991

[54] OPTICAL INTERCONNECT ARRANGEMENT

[75] Inventors: Rodney C. Alferness, Holmdel, N.J.; Zigmantas L. Budrikis, Dalkeith, Australia; David W. Hagelbarger, Nederland, Colo.; Herwig W. Kogelnik, Rumson; Arun N. Netravali, Westfield, both of N.J.

[73] Assignee: AT&T Bell Laboratories, Murray Hill, N.J.

[21] Appl. No.: 350,962

[22] Filed: May 12, 1989

[51] Int. Cl.$^5$ ............................ G02B 6/28; G02B 6/26
[52] U.S. Cl. ............................... 350/96.15; 350/96.16; 350/370
[58] Field of Search ............... 350/96.10, 96.15, 96.20, 350/96.21, 96.29, 370, 375, 376, 377, 378

[56] References Cited

U.S. PATENT DOCUMENTS

| | | | |
|---|---|---|---|
| 3,872,293 | 3/1975 | Green | 235/81 |
| 4,384,760 | 5/1983 | Alferness | 350/96.14 |
| 4,735,489 | 4/1988 | Tolksdrof et al. | 350/96.13 X |
| 4,787,692 | 11/1988 | Spanke | 350/96.13 X |

OTHER PUBLICATIONS

"Waveguide Electrooptic Modulators," by R. C. Alferness, IEEE Transactions on Microwave Theory and Techniques, vol. MTT-30, No. 8, pp. 1121-1137, Aug. 1982.
"Guided-Wave Devices for Optical Communication," by R. C. Alferness, IEEE Journal of Quantum Electronics, vol. QE-17, No. 6, pp. 946-959, 6/81.
"Compact Layout of Banyan/FFT Networks," by D. S. Wise, Proc. CMU Conf. VLSI Syst. Computations, pp. 186, 195, 1982.
"Waveguide Electro-Optic Polarization Transformer," by Alferness and Buhl, Appl. Phys. Lett. 38(9), pp. 655-657, May 1, 1981.

Primary Examiner—Akm Ullah
Attorney, Agent, or Firm—Henry T. Brendzel

[57] ABSTRACT

An arrangement for butt coupling of waveguide electrooptic plates to form a crossbar switch. The arrangement includes a stack of M splitter plates, each of which routes an injected optical signal to one of N outputs, and a stack of N combiner plates, each of which routes the signal of a selected one of M inputs to a common output. The stack of splitter plates is rotated with respect to the stack of combiner plates and the output signal ports of the splitter plates are coupled to the input signal ports of the combiner plates, so that each output of an splitter plate is connected to a different combiner plate. Within each splitter plate there is a fan-out network of waveguide electrooptic couplers and each coupler, under electric control, routes signals from one input to either one of two outputs. With j levels of such interconnected couplers $2^j$ output are developed. The combiner plates have an identical architecture but with a signal flow in the reverse direction. Butt coupling of the splitter and combiner plates is achieved by employing splitter and combiner plates of a different crystal cut, by interposing polarization rotation means between two stacks, or by including polarization rotation means within the splitter plates, the combiner plates or both.

19 Claims, 8 Drawing Sheets

OPTICAL INTERCONNECT ARRANGEMENT

BACKGROUND OF THE INVENTION

This invention relates to electrooptic waveguide circuits and, more particularly, to methods and apparatus for coupling energy between electrooptic waveguide substrates.

Research on integrated optics has been going on for some years now, with particular emphasis on developing effective and efficient electrooptic waveguide switches/modulators. Such devices are very attractive for signal encoding, multiplexing, optical frequency shifting, signaling and, particularly, switching. There is a large volume of literature on the subject of electrooptic waveguide modulation. The following two references, which present tutorial reviews, form a good starting point. Waveguide Electrooptic Modulators, Rod C. Alferness, IEEE Transactions on Microwave Theory and Techniques, Vol MTT-30, No. 8, August 1982, pp 1121-1137; and Guided-Wave Devices for Optical Communication, Rod C. Alferness IEEE Journal of Quantum Electronics, Vol. QE-17, No. 6, June 1981, pp 946-959.

A brief description of relevant portions of these articles is presented herein in conjunction with FIG. 1 for the sake of competeness.

Integrated waveguide modulators of a form not unlike the one shown in FIG. 1 can be created in various materials and accordance with various techniques. A waveguide modulator can be realized, for example, with light channels created in a Lithium Niobate substrate, such as channels 10 and 15 in FIG. 1. The channels may be created by diffusing Ti into the substrate, thereby causing the refractive index in the channels to be greater than in the surrounding region. When the difference in refractive indices is large enough, light that is injected into channel 10 at point 11 travels through the channel without significant dispersion into region 20. Somewhere along its path, the light traveling in channels 10 and 15 passes through region 30 of the substrate. Within region 30, channels 10 and 15 are situated in close physical proximity to each other and are bordered by electrodes 41 and 42. By choosing an appropriate separation between the waveguides and the interaction length, all of the light incident on one of the waveguides exits in the other via distributed evanescent coupling. Thus, the light traveling through channel 10 exits the substrate at point 17. In a similar fashion, light may be injected into channel 15 at point 16. It exits at point 12. Applying a voltage to the electrodes causes a phase shift in the light traveling through channel 10 within region 30. The phase shift reduces the coherent coupling between waveguides 10 and 15. With an appropriate voltage the output optical signal at port 17 reduces essentially to zero. The same conditions apply to light injected into channel 15.

The arrangement depicted in FIG. 1 is akin in its operation to a cross-connected double-pole, double-throw switch. When a voltage is applied to electrodes 41 and 42, light injected into ports 11 and 16 exits at ports 12 and 17, respectively. This is the "pass thru" connection. When no voltage is applied, the light of channels 10 and 15 crosses over to the other channels and exits at ports 17 and 12, respectively. This is the "crossover" connection. Viewed another way, when a detector is placed at one of the outputs and different signals are applied at the two input ports, then the FIG. 1 circuit serves as a selector, combiner, or multiplexer. Conversely, when the a detector is placed at both outputs, and only one input has an applied input signal, then the FIG. 1 circuit serves as a demultiplexer. Thus, the modulator of FIG. 1 can be a switch, a multiplexer, or a demultiplexer.

Implementing one switch, or even realizing a number of switches on a single substrate is only of marginal value. The key to utilization of the technology must lie in the ability to easily and effectively construct relatively large switching networks. To achieve that, three issues must be addressed. The first issue is the ability to create many switches on a single substrate. The second issue is the creation of an efficient architecture for building an optical switch network from individual switches and/or from smaller switch networks. The third issue is the development of means for interconnecting the substrates that contain the switches and the switch networks.

The latter two issues need better solutions than the ones that are available in the prior art.

Transmission of information from one electronic circuit board to another via an optical medium has been accomplished with fibers. This is often referred to as the optical backplane approach. Generally, this approach involves the use of light emitters and light detectors at the transmitting and the receiving ends of the transmission medium. It is an inefficient approach for interconnecting boards or substrates of electrooptic waveguides that contain a modest amount of logic (e.g., switches) per connection.

In the optical computing field, 3D interconnections are implemented with fiber arrays (e.g., U.S. Pat. No. 3,872,293 issued to E. L. Breen on Mar. 18, 1975), or in "free space". In "free space", the connection pattern is fixed since the optical signal paths are controlled in bulk by the medium. That, per se, is not an insurmountable impediment, and U.S. Pat. No. 4,913,959, issued on 06/05/1990 demonstrates that fact. That application discloses an arrangement for performing a perfect shuffle on an incoming set of signals. The perfect shuffle permits an arbitrary interconnection to be realized by the use of a sufficient number of interconnection stages.

Alas, the connection techniques that are used in free space optical computing are not applicable to waveguide electrooptics because these techniques basically rely on emission of light by the sending elements and detection of light by the receiving element. In a sense, this is the same technique that is used in the optical backplane. No specific match in polarization is generally necessary for the detection function.

Interconnection in three dimensional space has also been employed in the electronics arts (in contrast to optics), although in a different manner. For example, in "Compact Layout of Banyan/FFT Networks" Proc. CMU Conf. VLSI syst. Computations, 1982, pp 186-195, D. S. Wise described an arrangement whereby a crossover network can be decomposed in a manner that permits realization of the overall circuit from a collection of circuit boards that are stacked and interconnected in three dimensions. Of course, the spatial arrangement described by Wise is useful only for the particular class of networks that he described; but once he decided that such a spatial organization is useful, no major impediments were presented for implementing the desired electrical interconnection. Electronic circuit wire connections for the described arrangement are quite conventional.

That is not the case with integrated optics where light travels in controlled channels as described above. The polarization state of the light is very critical and the positioning alignment of the elements that emit light and the elements that accept the light is exacting.

SUMMARY OF THE INVENTION

In accordance with the principles of our invention, an optical crossbar switch is realized by joining substrates, or plates, of electrooptic modulators, essentially through butt coupling of the plates. More specifically, a crossbar switch is realized by stacking a plurality of fan-out or splitter plates, stacking a plurality of fan-in or combiner plates, rotating one of the stacks with respect to the other stack, and joining the rotated and the unrotated stacks.

Each splitter plate accepts an injected optical signal and, under voltage control of electrooptic modulations on the plate, routes the injected signal to one of M splitter outputs.

Each combiner plate accepts injected optical signal at each of N combiner inputs and, under voltage control of electrooptic modulators on the plate, routes a related input to the output of the plate. By stacking N splitter plates and M combiner plates, and rotating one of the stacks, the arrangement yields the capability to route any injected input on any splitter plate to any selected combiner plate and to route the signal received at the input of the combiner plate to the plate's output.

The different light polarizations that are required for the two plate stacks are obtained in our invention with different means. One such means is a birefringent half wave plate interposed between the splitter stack and the combiner stack. The plate provides a rotation of 90 degrees in the spatial orientation of the polarization plane of light. Another means is manufacturing the combiner plates from a material that is compatible with the polarization plane orientation of the light injected into the splitter plates and into the combiner substrates. For example, for the important Lithium Niobate material system, when the splitter plates are manufactured from an x-cut crystal, the combiner plates are manufactured from a z-cut crystal. Still another means is including light polarization converters at the outputs of the splitter plates, at the inputs of the combiner plates, or both.

A more in-depth understanding of our invention can be had by perusing through the detailed describing and the drawings wherein:

DETAILED DESCRIPTION

Figure 1:
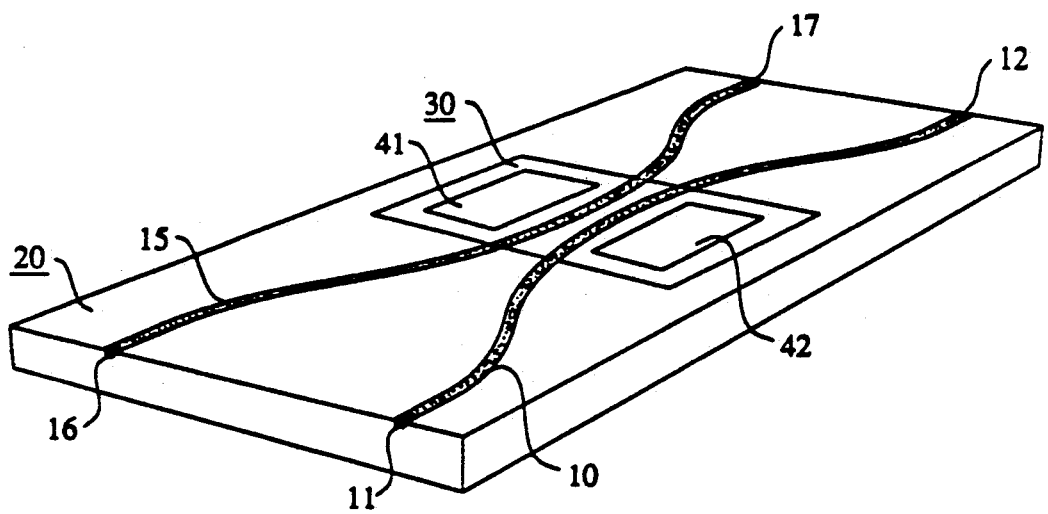
FIG. 1 illustrates the general structure of an electrooptic switch/modulator.
Figure 2:
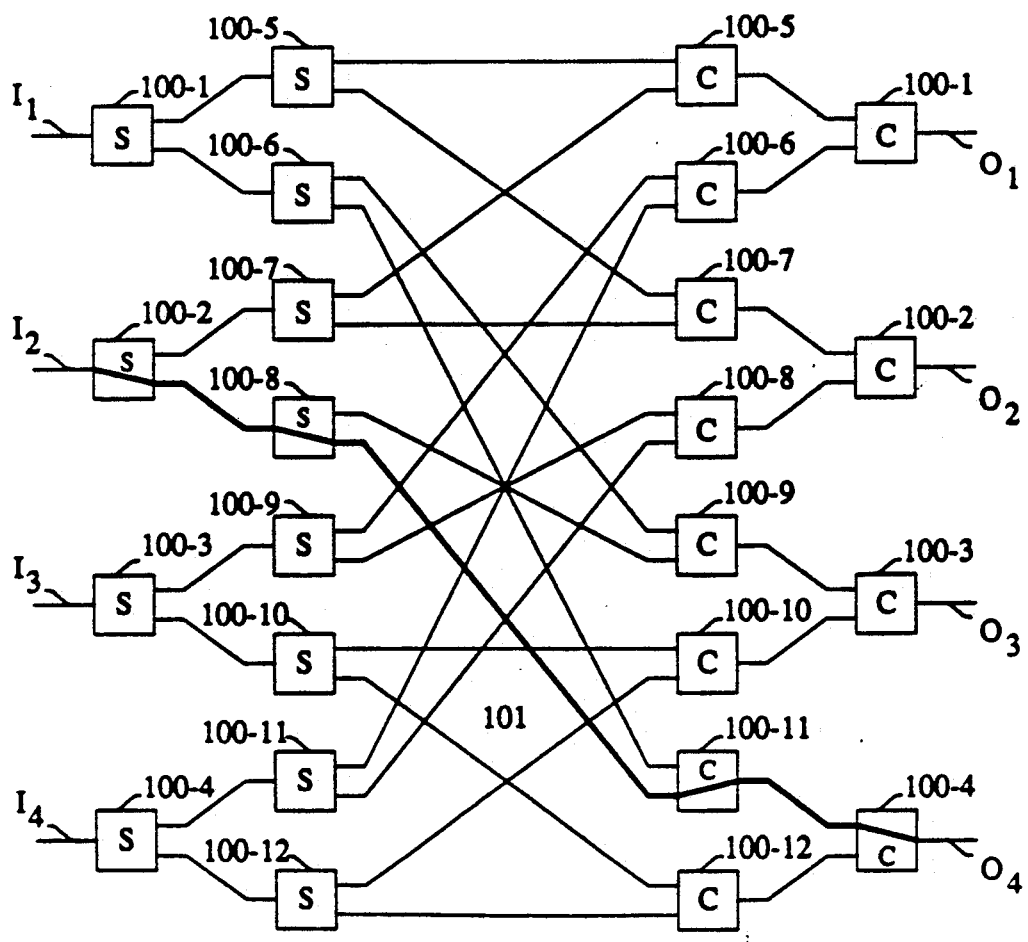
FIG. 2 presents a block diagram of a waveguide electrooptic routing switch using fan-out/fan-in principles.

Waveguide electrooptic switches, or couplers, can be used as cross-coupled double-pole, double-throw switches, as described above. The need, however, is to create a larger and more robust switch architecture. FIG. 2 presents one fulfillment of this need.

FIG. 2 includes 24 electrooptic couplers, with 12 arranged as dynamically controlled splitters and 12 arranged as combiners. Four primary inputs $I_i$ (i=1,2,3,4) are connected to four first level splitters 100-1, 100-2, 100-3, 100-4, and the two outputs of each of the first level splitters are each connected to a second level of splitters 100-5 through 100-12. The second level of splitters results in sixteen outputs. The sixteen outputs of the second level of splitters are connected to sixteen inputs of eight second level combiners 110-5 through 110-12. The outputs of the eight second level combiners are connected to four first level combiners that yield four primary outputs $O_i$ (i=1,2,3,4). If one were to number the sixteen outputs and the sixteen inputs in a manner that corresponds to the numbering of the inputs and the outputs, the interconnection of the outputs to the inputs in FIG. 2 can be defined by "output i is connected to input (i+4) mod 15".

Generalizing on FIG. 2, it can be said that the figure depicts a routing switch arrangement having $M=2^m$ inputs and $N=2^n$ outputs. Each input is applied to a splitter that, through n successive binary fan-out stages, allows the input to be connected to any one of N outputs. Each output in the set of N splitter outputs that are developed for each input is connected to an input of a different one of N combiners. Each combiner has M inputs and m combining binary fan-in stages that develop a single output. The values of M and N need not be the same and they need not be binary.

To accomplish switching with the FIG. 2 arrangement, it is necessary to switch actively only the splitters or the combiners. For example, each of the combiners can be arranged to simply add the two inputs, and since only one of the inputs would receive information, no switching is necessary in the combiner. On the other hand, by making both the splitters and the combiners active, insertion loss and crosstalk can be minimized. When reducing the crosstalk and insertion loss is important, such switching is the preferred approach. Thus, to switch a signal from $I_2$ to $O_4$, for example, path 101 must be enabled. That requires that couplers 100-2 and 100-8 should direct their received light downward, coupler 110-11 should select its lower input signal, and coupler 110-4 should select its upper input signal.

An (N×N) switch of the type described above requires a total of 2N(N-1) couplers. This is almost double the number of switches that are required in a conventional (N×N) crossbar switch. However, the FIG. 2 architecture has a number of important advantages. For example, the interconnections of the splitter couplers and of the combiner couplers, among themselves, contain no crossovers. In waveguide electrooptic technology, this is a clear advantage.

Although FIG. 2 presents a useful architecture, it does leave the question of how to create the splitter couplers and the combiner couplers, and how to connect the splitter couplers to the combiner couplers.

As for the manufacture of the combiner and splitter couplers, in accordance with the principles of our invention, the splitter couplers and the combiner couplers are divided into sets, and the sets are manufactured as integral units. A splitter coupler set is the collection of couplers to which a particular input port of the FIG. 2 arrangement can send a signal. Similarly in connection with combiner coupler sets. In the case of input $I_1$, for example, the set includes splitter couplers 100-1, 100-5, and 100-6. In accordance with the principles of our invention, therefore, an entire coupler set is manufactured on a single plate.

Figure 3:
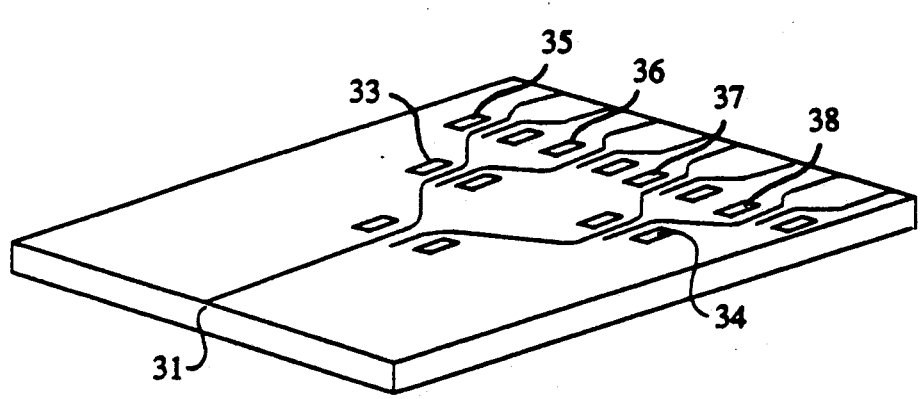
FIG. 3 depicts the layout of modulators on a plate that routes on applied optical signal to one of eight outputs.

FIG. 3 illustrates the layout of a plate that routes one optical input to one of eight outputs and thereby encompasses an entire combiner coupler. In operation, an optical signal is injected in entry port 31. The signal enters the first level switch (32) which directs the signal to either one of two outputs. We call this switch "a splitter" because diagramatically it looks like it splits the incoming path into two outgoing paths. Each outgoing path of the first level splitter is connected to a second level splitter. There are two second level splitters (33,34) and they produce four outgoing paths. The second level output paths are connected to third level splitters. The four third level splitters (35-38) have eight output paths.

The signal entering port 31 is injected into either splitter 33 or splitter 34; and the splitter with the signal routes it to either one of its outputs. Since the state of the splitter without the signal is completely irrelevant, the second level splitters share a common control signal. Similarly, the third level splitters share a common control signal. The optical signal of port 31 is routed in this manner to one of the eight output paths.

Thus, with n splitter levels (n=3) and n control signals (n=3) the FIG. 3 plates routes the injected signal to one of $2^n$ ($2^n=8$) paths. The control pads that control the routing, and the signals that are applied to the control pads are not shown in FIG. 3 for sake of simplicity. It is understood, however, that an actual implementation includes the necessary controls. Since the combiner couplers arrangement is completely symmetric to the splitter couplers arrangement, in accordance with our invention the entire switch can be made up of identical plates. Simply reversing the entry point of light converts an combiner coupler into a splitter coupler.

Figure 4:
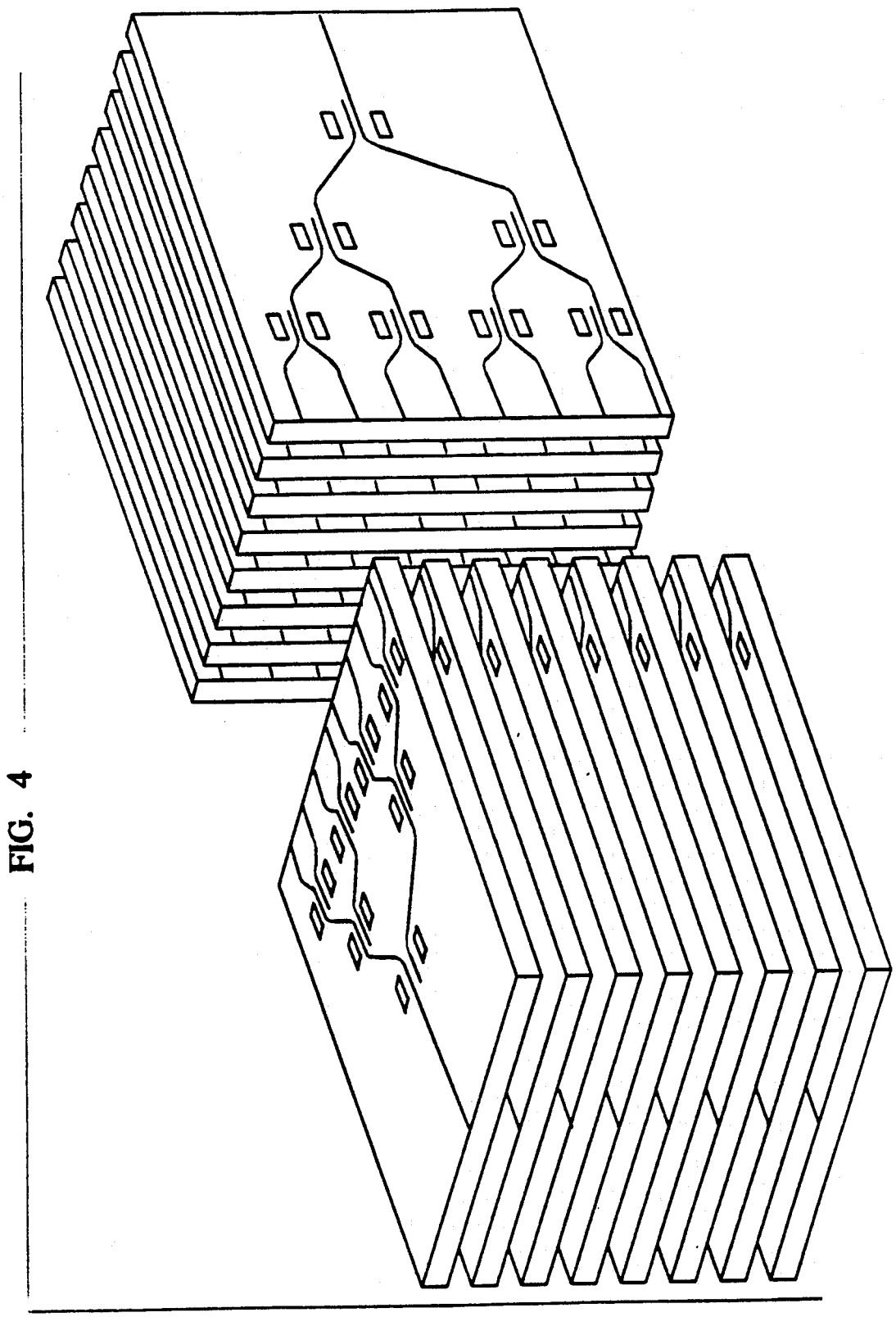
FIG. 4 shows the stacking and interconnection of input coupler plates and output coupler plates to form an 8×8 switching network.

As for the interconnection of the combiner couplers to the splitter couplers, FIG. 4 depicts our novel arrangement for the plates of FIG. 3, which realizes the switch architecture of FIG. 2—an 8×8 optical routing switch. In FIG. 4, the plates of the splitter couplers are stacked substantially parallel to each other with the edges that contain the eight outputs being lined up with each other. The result of such stacking is that a rectangular array of output ports is formed when viewed at end-on. The rows of the array are formed from the collection of output ports of each horizontal plate, and the columns of the array are formed from the collection of output ports having the same relative position in each of the horizontal plates. For a proper alignment, of course, the spacing between the combiner plates must be adjusted to correspond to the spacing between the output ports of the splitter plates, and vice-versa.

The arrangement of plates as shown in FIG. 4, once invented for the purpose of realizing the interconnection pattern of FIG. 2, presents no implementation problem in the electronic arts. Just as Wise interconnected his circuit boards to form a Banyan Network, so would the FIG. 4 interconnection of plates be realized. In the integrated waveguide electrooptic art, however, the interconnection is not simple because the polarization of light exiting the splitter plates must be matched, in most waveguide material technologies, to the required polarization of light that enters the combiner plates to minimize the voltages required to control the switches.

Figure 5:
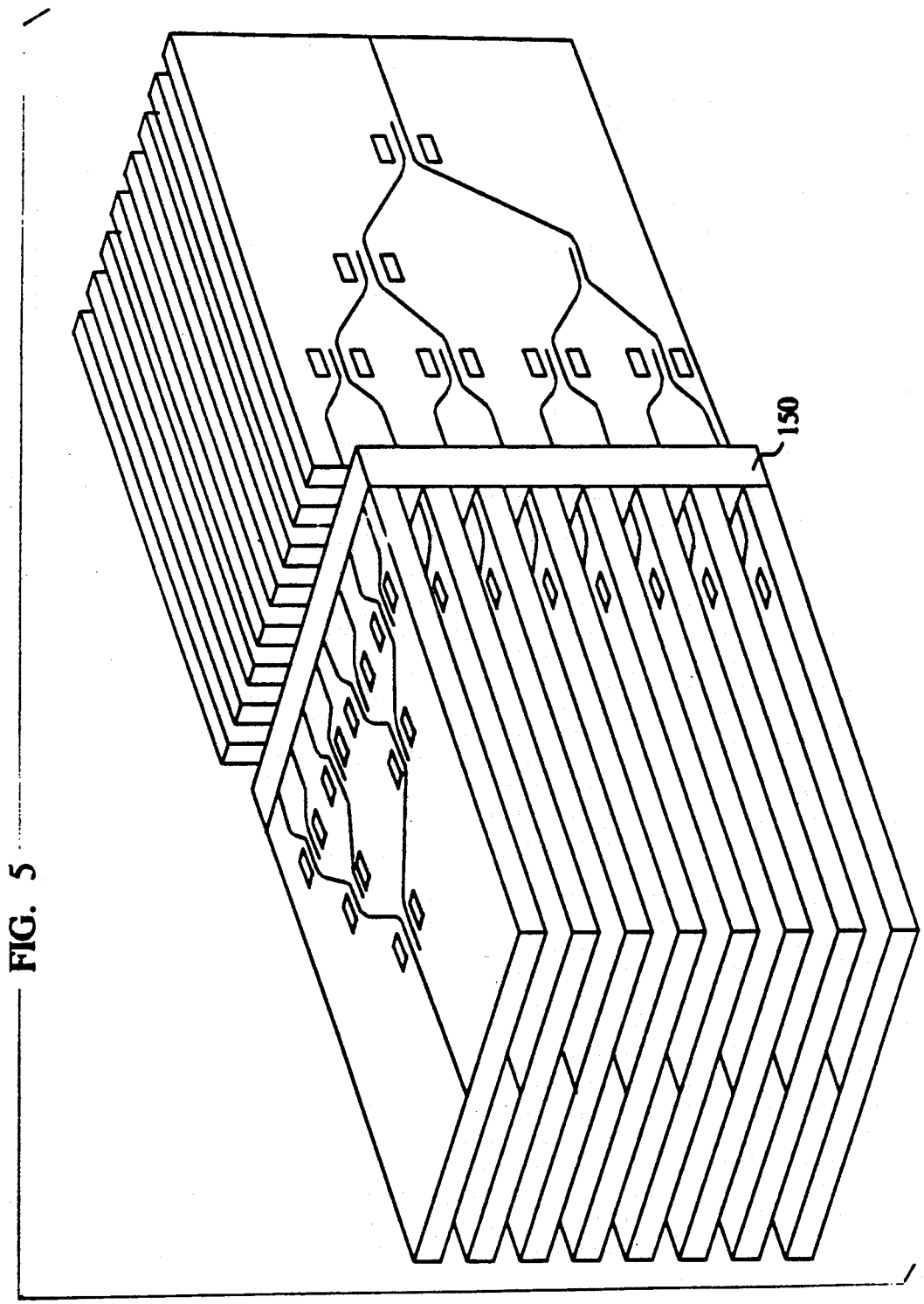
FIG. 5 presents a solution to a signal polarization problem in the FIG. 4 arrangement, using a half wave plate.
Figure 6:
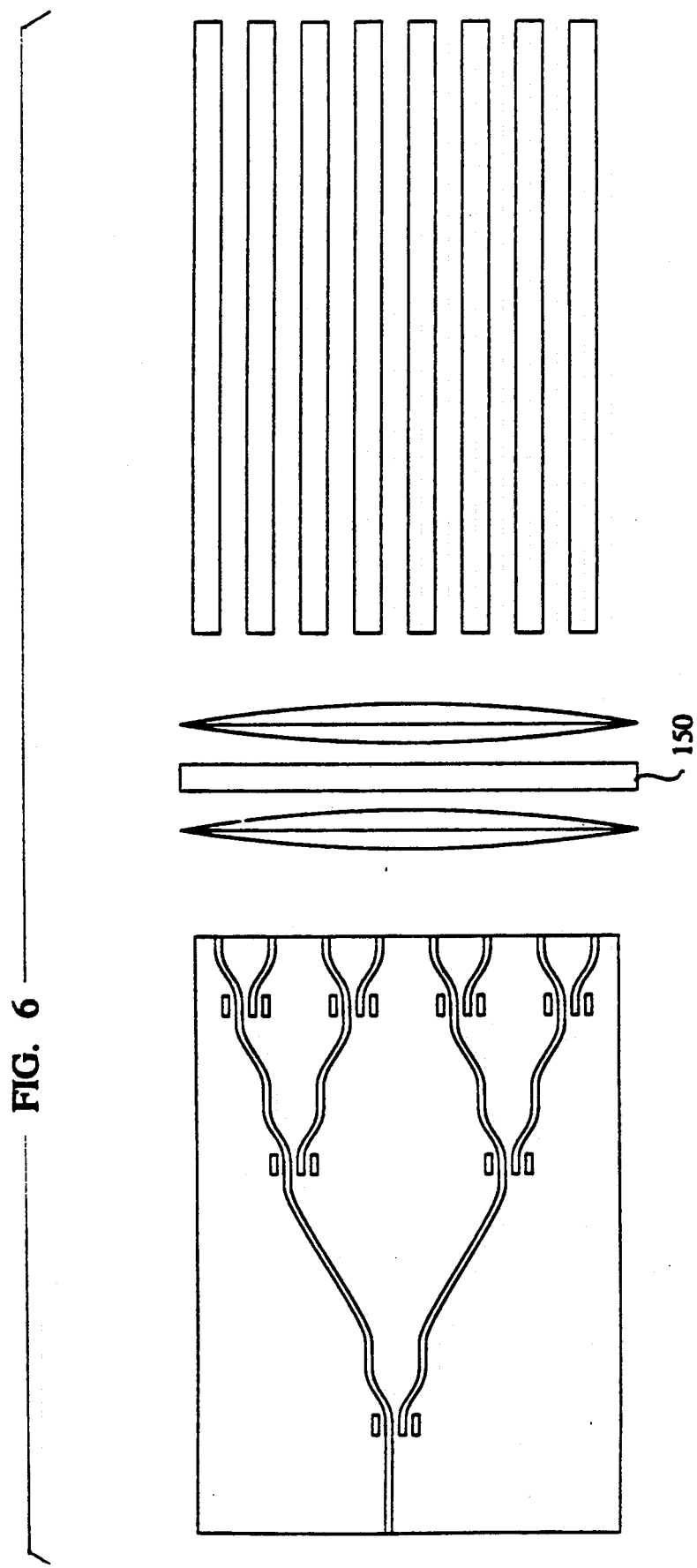
FIG. 6 shows the use of focusing lens with the arrangement of FIG. 5.

FIG. 5 presents one solution in conformance with the principles of our invention. In FIG. 5, the splitters and combiners of the FIG. 4 arrangement are identical and, therefore, the crystal cut of the plates requires a particular polarization mode of the light passing through the channels. Because of the different spatial orientation of the combiner and splitter couplers, a rotation in the polarization plane of the light is necessary. To achieve this rotation, the combiner and splitter couplers are separated somewhat from each other, and a half wave plate 150 is inserted therebetween. The polarization axis of plate 150 must be adjusted properly (at 45° with respect to the plane of the plates) and when so adjusted, the polarization of light existing the splitter couplers is rotated by 90° prior to its injection into the combiner couplers. Imaging lenses can be included on either or both sides of plate 150 for more effective focusing of the light onto the combiner channels. That is, when it is deemed that the coupling loss between the splitter plates and the combiner plates is too great because of the spacing introduced by plate 150, one can separate the two stacks still further by two focal lengths of a focusing lens and insert two such lens as shown in FIG. 6. FIG. 6 is the front view of the stack arrangement. It should be realized, of course, that the use of half wave plate 150 requires the orientation of the combiner plates to be close to 90° away from the orientation of the splitter plates. If one wishes to employ a magnetic means for polarization rotation, a Faraday rotator can be substituted for plate 150; and with such a rotator the 90° spatial orientation would not necessarily have to be maintained.

Figure 7:
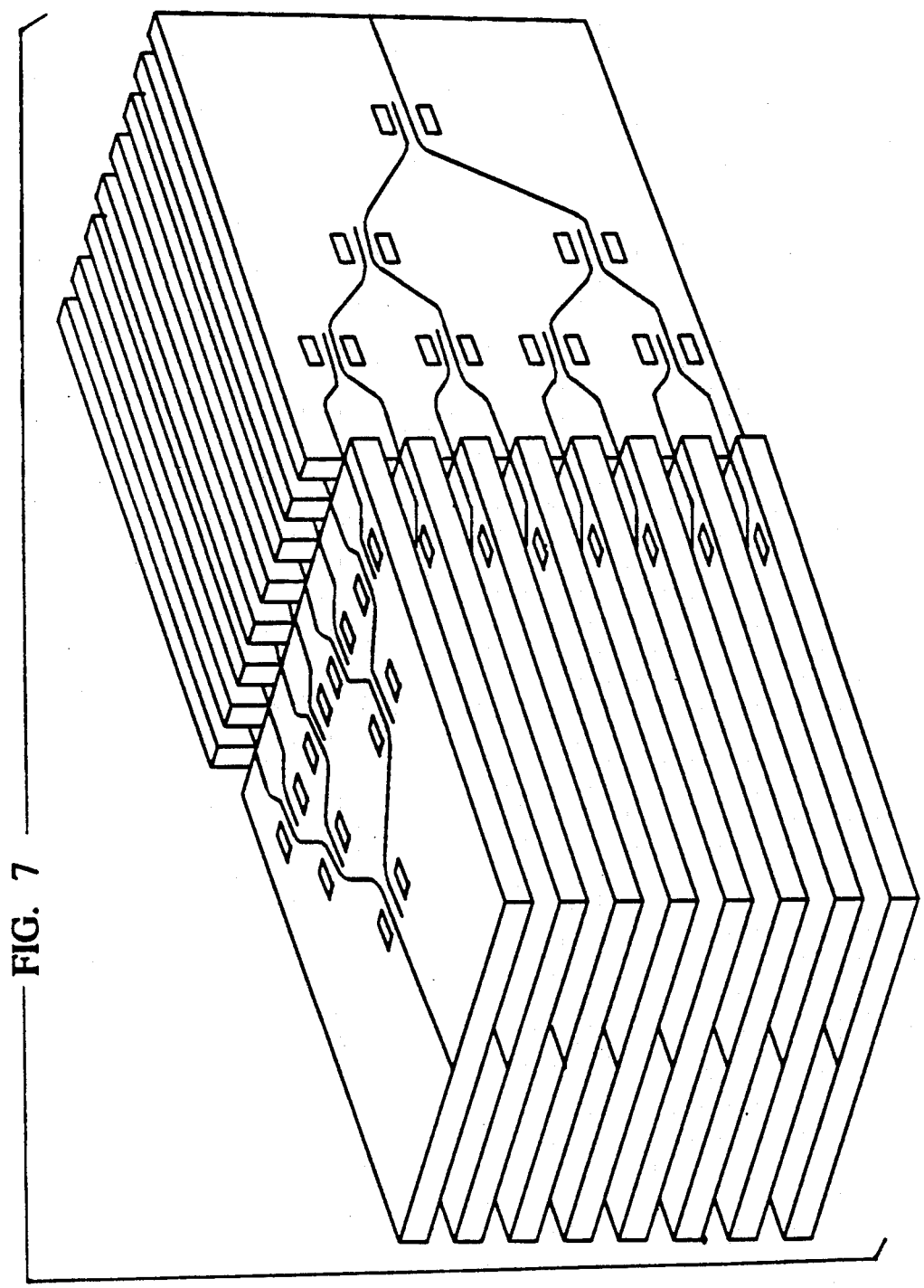
FIG. 7 presents a solution using different cut crystals for the combiner plates and the splitter plates.

In accordance with another aspect of our invention, the FIG. 2 structure is created with butt coupling of the combiner and splitter couplers, as depicted in FIG. 7.

Unlike the FIG. 5 realization, the combiner couplers and the splitter couplers of the FIG. 6 realization are not identical. Specifically, the combiner couplers and the splitter couplers are manufactured for different preferred light polarizations and, more specifically, for preferred light polarizations that are 90° rotated. The splitter plates can be manufactured, for example, for a preferred light polarization (e.g., requiring minimum control voltage) that is perpendicular to the large flat surface of the plates. The plane of polarization of the incoming signal is then arranged to be perpendicular to the large surface of the splitter plates. The polarization of light exiting the splitter couplers and entering the combiner couplers is consequently in a plane that is parallel to the large surface of the combiner plates. For light to be accepted by the combiner couplers, that requires the combiner plates of FIG. 6 to be manufactured from a material with similar polarization mode preference.

The different combiner and splitter plates can be created from different materials, or from the same material. For example, in our preferred embodiment Lithium Niobate substrates are used. One of the plates (e.g. the combiner plates) is manufactured with an x-cut crystal orientation, while the other is manufactured with a z-cut crystal orientation.

Figure 8:
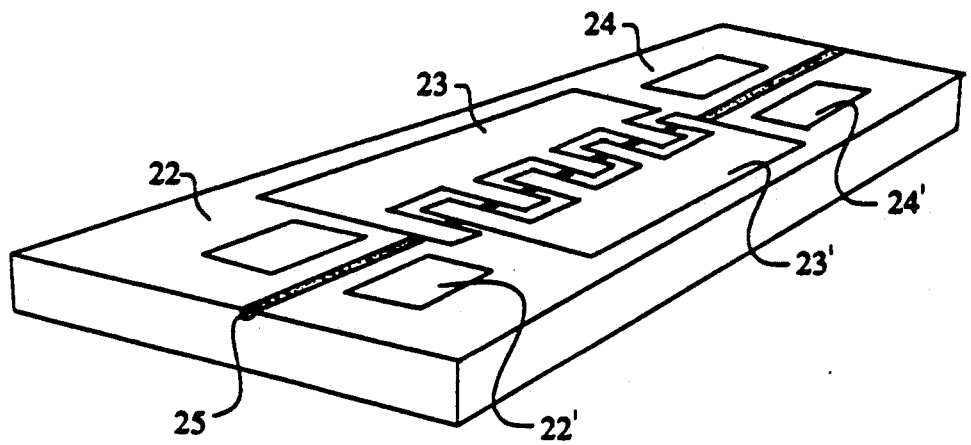
FIG. 8 illustrates an example structure of a polarization converter.

In accordance with still another aspect of our invention, butt coupling of the plates is achieved nevertheless with the same material and the same crystal cut of the material. In U.S. Pat. No. 4,384,760 issued on May 24, 1983, R. C. Alferness discloses a novel electro-optic device that can controllably alter the polarization of light that passes through the device. This device is also described by Alferness and Buhl in "Waveguide electro-optic polarization transformer", Appl. Phys. Lett. 38(9), May 1, 1981, pp 655-657. FIG. 8 is essentially a copy of FIG. 2 in the aforementioned patent. Briefly, the device described in FIG. 7 includes a light channel 25, electrodes 22 and 22' which provide an input phase shift to the light within channel 25, electrodes 24 and 24' which provide mode conversion, and electrodes 23 and 23' which provide an output phase shift. The input phase shift electrodes change an injected light that is circularly or elliptically polarized into an linearly polarized light. The mode converter electrodes convert the polarized light from one mode to another, and the output phase shift electrodes insure that the light exiting the device is, again, linearly polarized.

Figure 9:
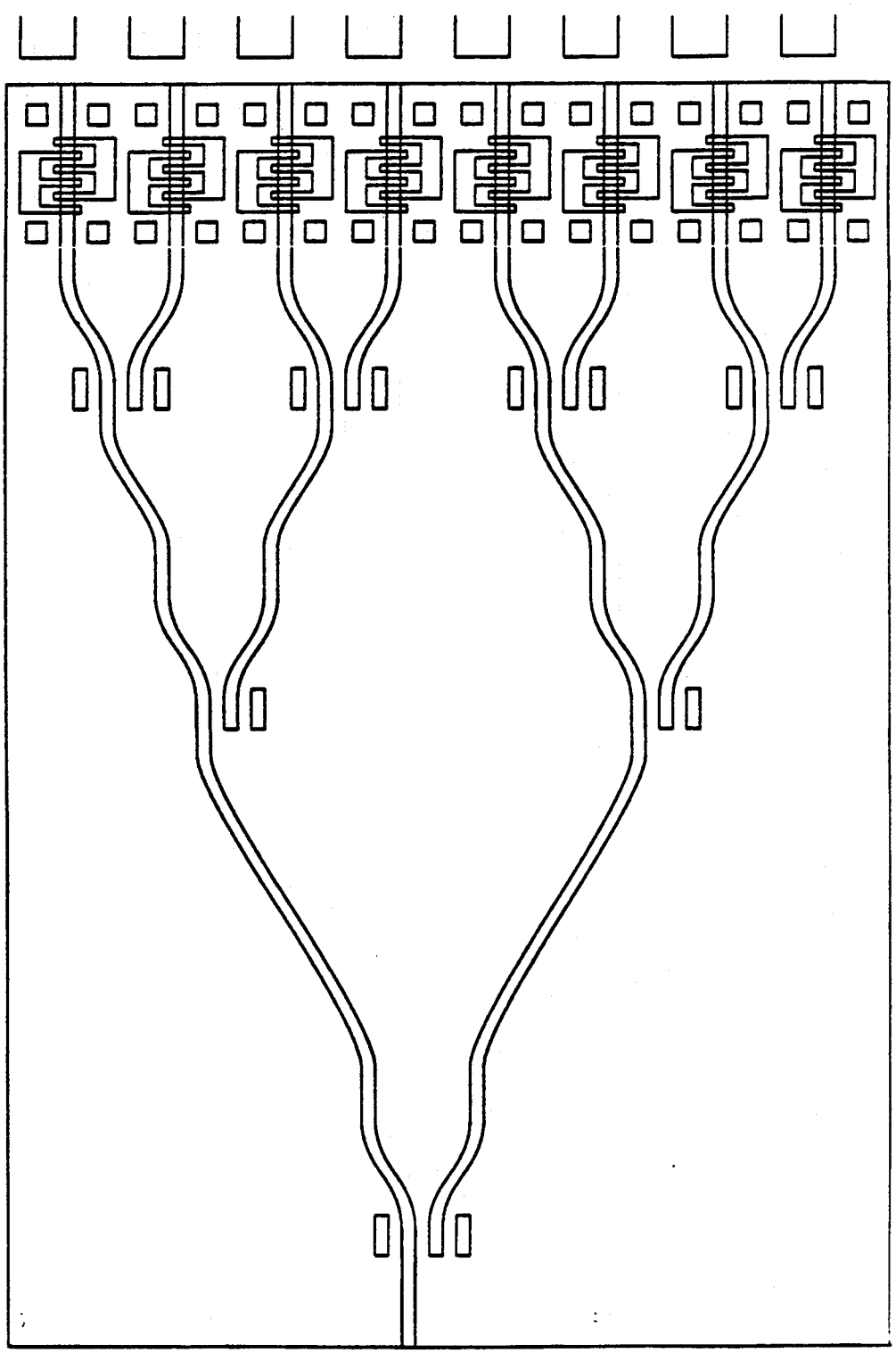
FIG. 9 depicts interconnections of combiner plates and splitter plates that contain a polarization converter.

FIG. 9 presents the front view of a plate that includes a polarization converter at each output. With this converter, butt coupling of the plates as in FIG. 7 is accomplished with identically manufactured plates and without the need of a separate polarization conversion means. It may be noted that the spatial phase shift induced by the polarization converters in both the combiner plates and the splitter plates is only 45°. Of course, if one is willing to have combiner couplers that are not identical to the splitter couplers, then one can insert polarization converters in only one of the coupler types, and those converters would need to provide a 90° spatial phase shift. Such polarization converters would not need to include the input phase shift electrodes because, in the application of FIG. 9, the input signal is of a known polarization.

Figure 10:
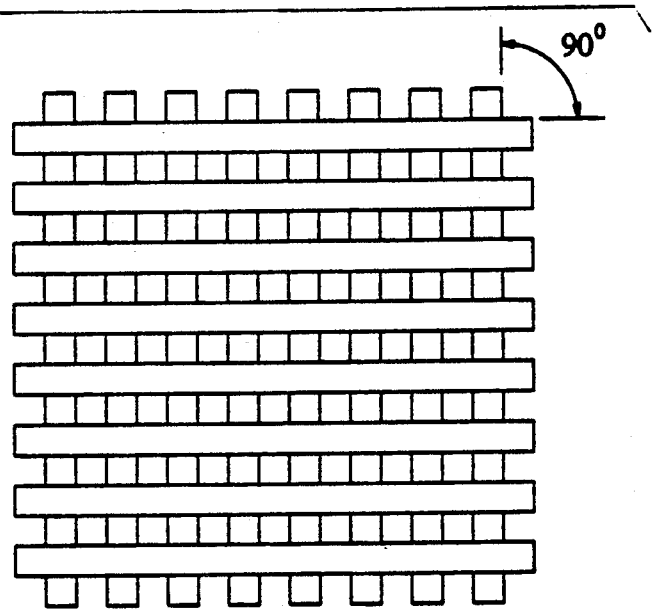
FIG. 10 illustrates an embodiment where the spatial orientation of the combiner plates is other than 90° with respect to the splitter plates.
Figure 10:
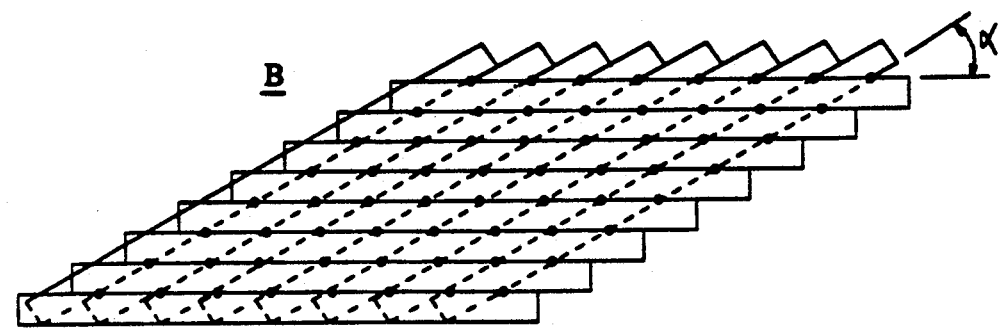

The arrangement of FIG. 5 illustrates the condition where the combiner plates and the splitter plates are at 90° to each other. That is neither a requirement nor a limitation of our structure. The only requirement is that the light at the output ports of the combiner plates, or splitter plates, should be efficiently coupled (i.e., with minimum loss) to the input ports of the splitter plates, or combiner plates. Since the channels of the combiner plates are situated directly across from the channels of the splitter plates, one can visualize the centers of the two sets of channels to be connected by pins about which the plates can rotate. With no spacers between plates, the structure is unstable, and can be collapsed so that the plates of each set (combiners and splitters) are touching each other. This is shown in FIG. 10, diagrams A and B. Of course, the B structure is a more compact and physically stable implementation, but it requires a rotation of the polarization of light through less than 90°($\alpha$). That can be accomplished with the plates used in the embodiment of FIG. 9, but with the input phase shift electrodes included and the voltage on the phase shift electrodes adjusted to provide the desired spatial phase shift.

We claim:

1. An arrangement comprising:

An M plurality of output plates each having N output ports delivering optical energy substantially along a line, said output plates being substantially parallel to each other, thereby forming an array of output energy ports;

an N plurality of input plates, each having M input ports for receiving optical energy substantially along a line, said input plates being substantially parallel to each other;

and means for coupling the optical energy of output j of plate i in said M plurality of output plates to input i of input plate j in said N plurality of input plates, where i is an integer in the range 1 to M and j is an integer in the range 1 to N.

2. The arrangement of claim 1 where said output plates are substantially perpendicular to said input plates.

3. The arrangement of claim 1 wherein each of said output plates includes means for routing optical signals to at least one of said output ports in response to applied first control signals, and each of said input plates includes means for routing optical information received at said input ports in response to applied second control signals.

4. The arrangement of claim 3 wherein each of the output plates includes one or more input ports for receiving optical energy and said means for routing within each of said output plates directs received optical energy from each of said input ports to a selected output port; and each of said input plates includes one or more output ports for delivering optical energy, and said means for routing within each of said input plates directs received optical energy to selected output ports of said input plates.

5. The arrangement of claim 3 wherein:

each of said input plates includes polarization rotation means interposed between said means for routing optical signals and said output ports, and each of said output plates includes polarization rotation means interposed between said means for routing optical signals and said input ports.

6. The arrangement of claim 5 wherein polarization rotation imposed by a polarization rotation means on one of said input plates and to the polarization rotation imposed by a polarization rotation means on one of said output plates combine to develop a 90° spatial rotation in polarization.

7. The arrangement of claim 5 wherein the polarization rotation imposed by a polarization rotation means on one of said input plates added to the polarization rotation imposed by a polarization rotation means on one of said output plates adds to an angle that is substantially the same as the angle that said input plates maintain with respect to said output plates.

8. The arrangement of claim 3 wherein:

each of said input plates includes polarization rotation means interposed between said means for routing optical signals and said output ports 9. The arrangement of claim 3 wherein:

each of said output plates includes polarization rotation means interposed between said means for routing optical signals and said input ports 10. The arrangement of claim 1 wherein said means for coupling comprises a polarization rotation means.

11. The arrangement of claim 10 wherein said polarization rotation means is a half wave plate.

12. The arrangement of claim 11, further comprising a focusing lens interposed on either side of said half wave plate.

13. The arrangement of claim 1 wherein said output plates are manufactured from a material having a first preferred polarization mode for routing light, while said output plates are manufactured from a material having a second preferred polarization mode for routing light, and said first and second polarization modes are substantially perpendicular to each other.

14. The arrangement of claim 13 wherein:
said output plates are substantially perpendicular to said input plates, and
said output ports of said output plates face said input ports of said input plates.

15. The arrangement of claim 1 wherein:
each of said input plates includes light switching means, channels for carrying light that interconnect said light switching means and channels for carrying light that terminate at said output ports; and
each of said output plates includes light switching means, channels for carrying light that interconnect said light switching means and channels for carrying light that terminate at said input ports.

16. The arrangement of claim 1 wherein said plates are made of Lithium Niobate.

17. The arrangement claim 16 wherein said channels are channels of diffused Titanium in said Lithium Niobate.

18. The arrangement of claim 1 wherein each of said input plates and each of said output plates comprises a plurality of waveguide electrooptic modulators.

19. The arrangment of claim 18 wherein each of said input plates comprises
a number of routing levels equal to $\log_2 N$, when N is a power of 2, and $\log_2 N$ rounded up, when N is not a power of 2,
each routing level includes at most $2^{j-1}$ of said modulators, where j is an integer that designates the level (j=1,2...),
each of said modulators has one input and two outputs, and
the input of each modulator in a level j greater than 1 is connected to an output of a modulator in a level j−1.

* * * * *